(12) United States Patent
Okuda et al.

(10) Patent No.: US 10,696,302 B2
(45) Date of Patent: Jun. 30, 2020

(54) INTERNAL COMBUSTION ENGINE CONTROL DEVICE

(71) Applicant: Hitachi Automotive Systems, Ltd., Hitachinaka-shi, Ibaraki (JP)

(72) Inventors: Yuuki Okuda, Tokyo (JP); Kazuhiro Oryoji, Tokyo (JP); Masayuki Saruwatari, Hitachinaka (JP)

(73) Assignee: HITACHI AUTOMOTIVE SYSTEMS, LTD., Hitachinaka-Shi (JP)

(*) Notice: Subject to any disclaimer, the term of this patent is extended or adjusted under 35 U.S.C. 154(b) by 169 days.

(21) Appl. No.: 15/762,404

(22) PCT Filed: Jul. 28, 2016

(86) PCT No.: PCT/JP2016/072100
§ 371 (c)(1),
(2) Date: Mar. 22, 2018

(87) PCT Pub. No.: WO2017/056668
PCT Pub. Date: Apr. 6, 2017

(65) Prior Publication Data
US 2018/0273037 A1    Sep. 27, 2018

(30) Foreign Application Priority Data

Sep. 30, 2015   (JP) .................... 2015-192530

(51) Int. Cl.
*B60W 30/18* (2012.01)
*F02B 41/10* (2006.01)
(Continued)

(52) U.S. Cl.
CPC ...... *B60W 30/18072* (2013.01); *B60W 10/06* (2013.01); *B60W 10/11* (2013.01);
(Continued)

(58) Field of Classification Search
CPC ............ B60W 30/18072; F02B 37/00; F02B 37/37005; F02B 41/10
See application file for complete search history.

(56) References Cited

U.S. PATENT DOCUMENTS 4,665,704 A * 5/1987 Hartwig ............... F02B 37/001
60/597
5,088,286 A * 2/1992 Muraji .................. F02B 37/10
60/608
(Continued)

FOREIGN PATENT DOCUMENTS

JP   2002-322762 A   11/2002
JP   2004-156528 A    6/2004
(Continued)

OTHER PUBLICATIONS

International Search Report with English translation and Written Opinion issued in corresponding application No. PCT/JP2016/072100 dated Oct. 18, 2016.

*Primary Examiner* — Sherry L Estremsky
(74) *Attorney, Agent, or Firm* — Foley & Lardner LLP

(57) ABSTRACT

An internal combustion engine control device is provided. The internal combustion engine control device is provided with a generator that is driven by exhaust gas of the internal combustion engine. The internal combustion engine control device is capable of increasing the power generation of the generator. The internal combustion engine control device includes an exhaust amount control unit. The exhaust amount control unit increases the amount of the exhaust gas supplied to the generator in a coasting state.

22 Claims, 13 Drawing Sheets

(51) Int. Cl.
| | |
|---|---|
| *F02D 29/06* | (2006.01) |
| *F02D 41/02* | (2006.01) |
| *F01N 5/04* | (2006.01) |
| *F02D 41/00* | (2006.01) |
| *F16H 61/21* | (2006.01) |
| *F02D 41/12* | (2006.01) |
| *F16H 59/74* | (2006.01) |
| *B60W 10/06* | (2006.01) |
| *B60W 10/11* | (2012.01) |
| *F02C 5/12* | (2006.01) |
| *F02C 9/16* | (2006.01) |
| *F02D 13/02* | (2006.01) |
| *H02P 9/00* | (2006.01) |
| *F02G 5/02* | (2006.01) |
| *H02P 101/25* | (2016.01) |

(52) U.S. Cl.
CPC ............... *F01N 5/04* (2013.01); *F02B 41/10* (2013.01); *F02C 5/12* (2013.01); *F02C 9/16* (2013.01); *F02D 13/0226* (2013.01); *F02D 13/0234* (2013.01); *F02D 29/06* (2013.01); *F02D 41/0002* (2013.01); *F02D 41/0005* (2013.01); *F02D 41/0225* (2013.01); *F02D 41/123* (2013.01); *F16H 59/74* (2013.01); *F16H 61/21* (2013.01); *H02P 9/008* (2013.01); *B60W 2030/18081* (2013.01); *B60W 2540/10* (2013.01); *B60W 2540/12* (2013.01); *B60W 2710/0605* (2013.01); *B60W 2710/0627* (2013.01); *B60W 2710/1005* (2013.01); *F01N 2900/08* (2013.01); *F02D 2013/0296* (2013.01); *F02D 2041/001* (2013.01); *F02D 2200/0406* (2013.01); *F02D 2200/101* (2013.01); *F02D 2200/501* (2013.01); *F02D 2200/602* (2013.01); *F02D 2200/70* (2013.01); *F02G 5/02* (2013.01); *F05D 2220/40* (2013.01); *F05D 2220/76* (2013.01); *F05D 2270/07* (2013.01); *F16H 2059/746* (2013.01); *H02P 2101/25* (2015.01); *Y02T 10/16* (2013.01); *Y02T 10/76* (2013.01)

(56) References Cited

U.S. PATENT DOCUMENTS

| | | | | |
|---|---|---|---|---|
| 5,327,992 | A * | 7/1994 | Boll | B60K 6/48 180/65.25 |
| 6,604,360 | B1 * | 8/2003 | Vuk | F01N 5/04 123/41.11 |
| 6,931,850 | B2 * | 8/2005 | Frank | B60K 6/44 60/597 |
| 7,047,743 | B1 * | 5/2006 | Stahlhut | F02B 37/18 123/562 |
| 8,253,260 | B2 * | 8/2012 | Oriet | B60K 6/48 290/43 |
| 9,777,620 | B2 * | 10/2017 | Jaeger | F01N 5/04 |
| 2008/0121218 | A1 * | 5/2008 | Algrain | F02B 37/013 123/565 |

FOREIGN PATENT DOCUMENTS

| | | |
|---|---|---|
| JP | 2011-099337 A | 5/2011 |
| JP | 2011-117310 A | 6/2011 |
| JP | 2013-155644 A | 8/2013 |
| JP | 2015-094255 A | 5/2015 |

* cited by examiner (a)

(b)

INTERNAL COMBUSTION ENGINE CONTROL DEVICE

TECHNICAL FIELD

The present invention relates to an internal combustion engine control device provided with a generator driven by an exhaust gas of an internal combustion engine.

BACKGROUND ART

There has been an attempt to use exhaust energy of an internal combustion engine for years. For example, exhaust energy is regenerated as electric power by a turbine driven by an exhaust gas and a generator driven by the turbine or a turbocharger pressure-feeding air to an internal combustion engine by a turbine driven by an exhaust gas and a compressor obtained by integrating a turbine and a shaft.

PTL 1 discloses a configuration of a generator attached turbocharger including an exhaust amount increasing unit for increasing an exhaust amount during an expansion cycle in each cylinder of an internal combustion engine at the time of increasing a power generation amount of a generator by the rotation of a turbine.

CITATION LIST

Patent Literature

PTL 1: Japanese Patent Application No. 2002-322762

SUMMARY OF INVENTION

Technical Problem

As illustrated in PTL 1, an effect of increasing a power generation amount by increasing an exhaust amount caused by a combustion gas is expected. However, since such a technique is devised on the assumption that the combustion of the internal combustion engine occurs, there is no consideration of increasing the power generation opportunity by increasing the exhaust flow rate to ensure the power generation opportunity also when the internal combustion engine is driven by an external force in a state where combustion does not occur, that is, a state where the driving force of the internal combustion engine is not necessary due to the coasting state.

In view of the above-described circumstances, an object of the invention is to provide an internal combustion engine control device provided with a generator driven by an exhaust gas of an internal combustion engine and capable of increasing a power generation opportunity of the generator.

Solution to Problem

An internal combustion engine control device according to the present invention is provided with a generator driven by an exhaust gas of an internal combustion engine, and includes an exhaust amount control unit which increases the amount of the exhaust gas supplied to the generator in a coasting state.

Advantageous Effects of Invention

According to the invention, since electric power is continuously generated by a generator provided in an exhaust path by increasing an exhaust flow rate also in a coasting state of a vehicle, a power generation opportunity of the generator can be increased.

DESCRIPTION OF EMBODIMENTS

Figure 1:
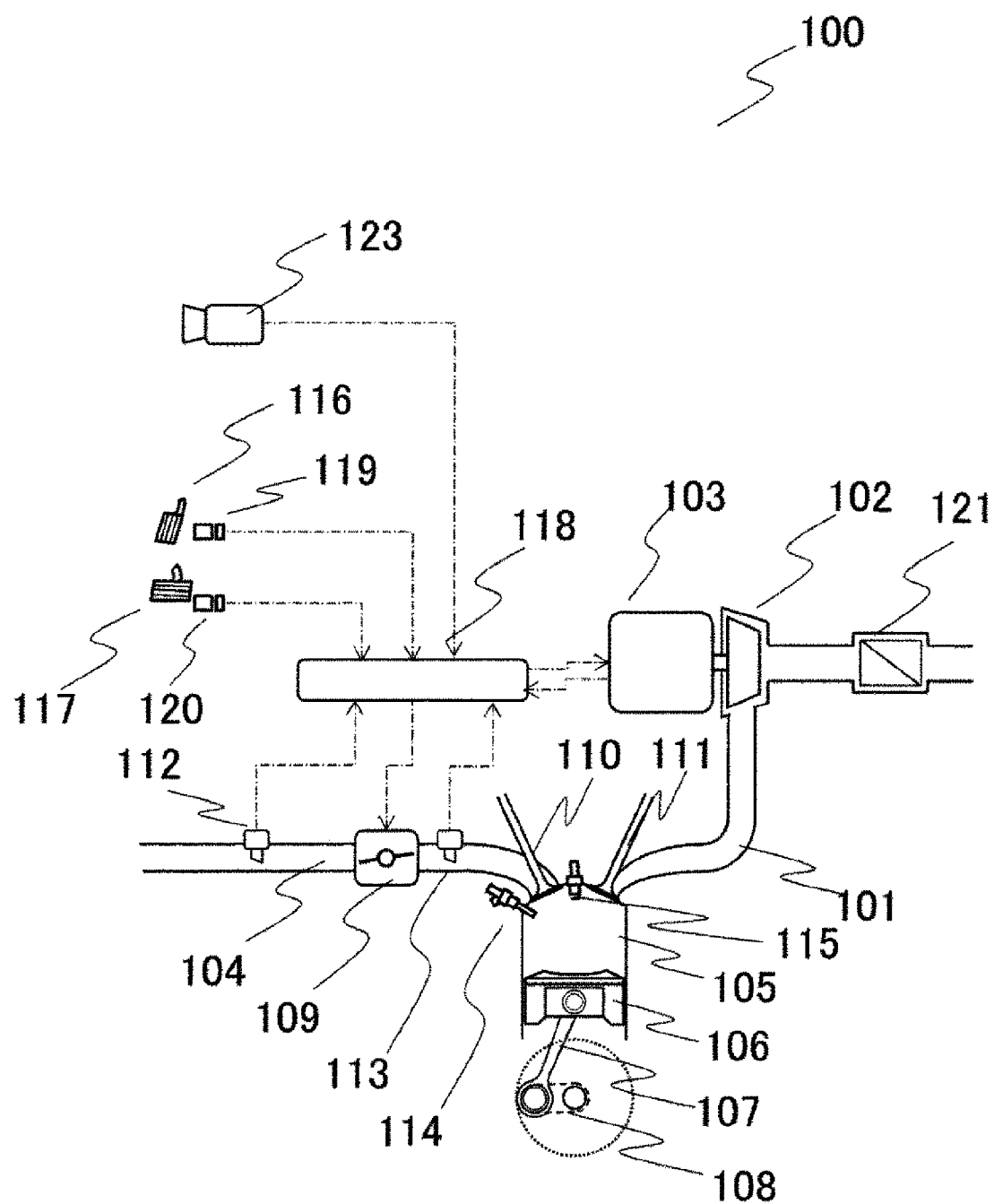
FIG. 1 is a configuration diagram of an internal combustion engine including an internal combustion engine control device of the invention.

Hereinafter, an embodiment of the invention will be described with reference to the drawings. FIG. 1 is a schematic diagram of an internal combustion engine 100 provided with an internal combustion engine control device of the invention. The internal combustion engine 100 includes a turbine 102 which is provided in an exhaust path 101 and a generator 103 which is driven by the turbine 102.

The internal combustion engine 100 generates a high-pressure combustion gas by taking air from an intake path 104 and burning fuel inside a combustion chamber 105 and converts the movement of a piston into a rotational force through a piston 106, a connecting rod 107, and a crank 108. Further, the piston 106 moves in a direction in which the volume of the combustion chamber 105 decreases by the rotation of the crank 108 and can repeat compression and expansion inside the combustion chamber 105. Power can be extracted in such a manner that the piston 106 rotates the crank 108 by the pressure of the combustion gas. The intake path 104 is provided with an intake throttle valve 109 and an intake valve 110 which adjusts the amount of air introduced into the combustion chamber 105.

The intake throttle valve 109 is, for example, a butterfly valve and adjusts an air passage amount by changing a rotation angle of a butterfly valve provided in a cross-sectional direction of the intake path to change a cross-sectional area in which the intake path is blocked.

The intake valve 110 is, for example, a poppet valve and increases an air passage amount by increasing a lifting amount to increase an effective cross-sectional area. In contrast, when the lifting amount decreases, an effective cross-sectional area decreases so that an air passage amount decreases. In this way, the intake valve 110 can adjust an air passage amount, and furthermore the amount of air introduced into the combustion chamber 105.

Further, since an exhaust valve 111 is provided in the boundary between the exhaust path 101 and the combustion chamber 105 similarly to the intake valve 110, a combustion gas generated by the combustion chamber 105 can be applied to the piston 106.

The amount of the air introduced into the combustion chamber 105 is measured by an air flow meter 112 or an intake pipe pressure sensor 113 and fuel is injected in response to the air introduced from the fuel injection valve 114 into the combustion chamber 105. When an air-fuel mixture is formed inside the combustion chamber 105 by the air introduced into the combustion chamber 105 and the fuel supplied from the fuel injection valve 114 and an ignition is performed by an ignition plug 115, the air-fuel mixture is burned to generate the above-described combustion gas.

After the combustion gas is expanded, the combustion gas is discharged into the exhaust path 101 through the exhaust valve 110. Since the air-fuel mixture is burned at a high temperature inside the combustion chamber 105, the combustion gas is kept at a high temperature and basically has a high temperature and a high pressure with respect to external air even at a time point when the combustion gas is discharged to the exhaust path 101 through the exhaust valve 110.

The turbine 102 further expands the combustion gas and converts the movement energy and the heat energy of the combustion gas into a rotational force to drive the generator 103.

Thus, when at least the pressure or the temperature at the upstream side (near the combustion chamber 105) of the turbine 102 is higher than that of the downstream side of the turbine 102 provided in the exhaust path 101, the turbine 102 converts the difference into a rotational force to drive the generator 103.

Incidentally, the internal combustion engine 100 is mounted on, for example, an automobile and an output is changed when a driver operates an accelerator pedal 116, a brake pedal 117, or a steering mechanism (not illustrated). The output is adjusted when the throttle amount of the intake throttle valve 109 is changed or the lifting amount of the intake valve 110, the fuel injecting amount from the fuel injection valve 114, and the ignition timing of the ignition plug 115 are changed.

Such a change, that is, a control is performed by a control device 118.

The control device 118 detects, for example, the operation of the accelerator pedal 116 by an accelerator stroke sensor 119. Similarly, the brake pedal 117 is provided with a brake stroke sensor 120 and the control device 118 calculates the target output of the internal combustion engine 100 based on the detection result of the accelerator stroke sensor 119 or the brake stroke sensor 120.

Based on the calculation result, the opening and closing timing for the crank 108, the fuel injecting amount from the fuel injection valve 114, and the ignition timing of the ignition plug 115 are controlled along with the throttle amount of the intake throttle valve 109 (or the rotation angle of the butterfly valve) or the lifting amount of the intake valve 110 or the exhaust valve 111, thereby controlling the internal combustion engine 110 in a desired driving state.

Thus, although not illustrated in the drawings, the control device 118 includes a ROM (Read Only Memory) storing the above-described control algorithm, a microcomputer executing the above-described calculation, and a RAM (Random Access Memory) storing information during the calculation. In addition, the control device may include an A/D converter (an analog-to-digital converter) quantizing an analog voltage signal output from various sensors or an I/F (an interface) and a communication I/O (Input-Output) exchanging information with other control devices.

Further, although not illustrated in the drawings, the internal combustion engine 100 is provided with, for example, a battery such as a lead battery which is a power source for driving the above-described control device or an alternator charging the battery. The alternator is an AC generator, transmits the rotational force of the crank 108 through a winding transmission mechanism, and generates electric power by the obtained rotational force. The electric power is converted into a direct current through an appropriate rectifying circuit to charge the battery. A charging device may be provided.

Figure 2:
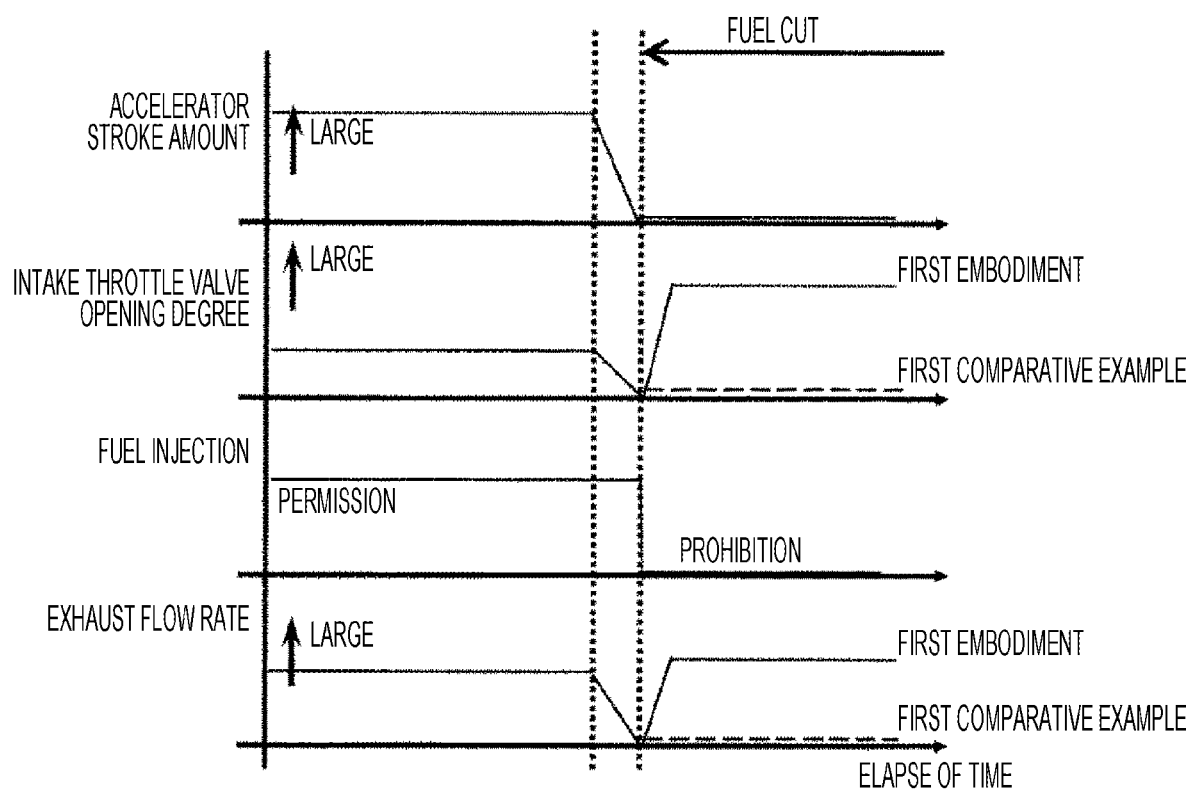
FIG. 2 is a time chart illustrating a transition to a coasting state of an embodiment of the invention.

FIG. 2 is a time chart illustrating a state where a vehicle equipped with the internal combustion engine 100 illustrated in FIG. 1 enters a coasting state. Based on the detection result of the accelerator pedal stroke sensor 119, the accelerator pedal is operated to decrease the stroke amount (to decrease the driving force request from the driver) and to decrease the throttle opening degree for reducing the amount of the air supplied to the internal combustion engine 100. As a result, when the accelerator stroke amount becomes zero and the driving force request from the driver disappears, the fuel injection from the fuel injection valve 114 is stopped and the vehicle enters the coasting state.

Figure 3:
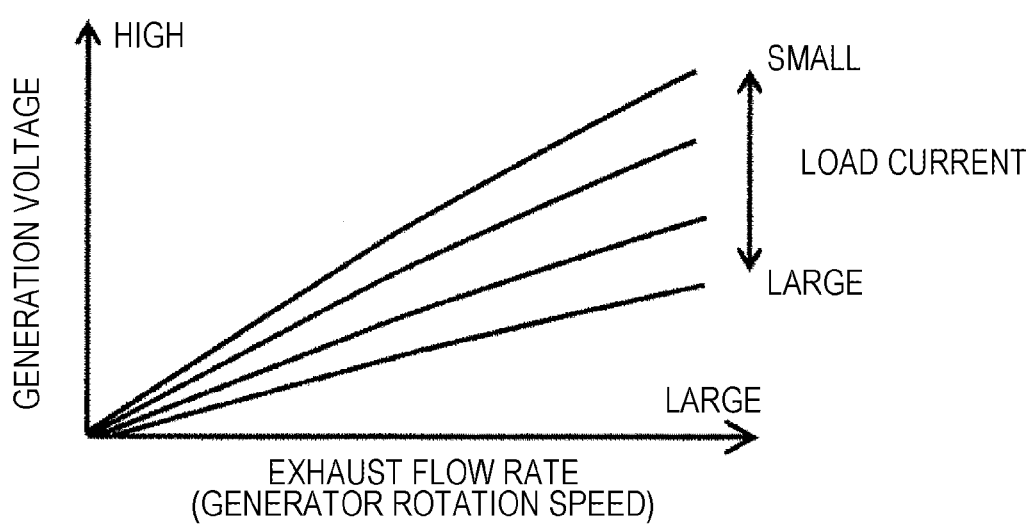
FIG. 3 is a diagram illustrating an output voltage characteristic of a generator of the invention.

FIG. 3 schematically illustrates an example of a generation characteristic of the generator 103 driven by the turbine 102 with respect to the exhaust flow rate. A horizontal axis of FIG. 3 indicates the flow rate of the exhaust gas and a generator voltage increases in accordance with an increase in exhaust flow rate to become a high voltage. Further, a load current indicates the magnitude of the current extracted from the generator 103 and the generation voltage decreases as the load current increases.

Thus, there is a need to increase the flow rate of the exhaust gas in order to increase the generation output of the generator 103 as illustrated in FIG. 3.

The coasting state indicates a state where the fuel injection may be stopped without increasing or keeping the vehicle speed at least by the driving force of the internal combustion engine 100.

Further, the coasting state indicates a state where at least the vehicle travels and the internal combustion engine 100 is rotationally driven by an axle or a transmission mechanism from a vehicle wheel.

Thus, since the internal combustion engine 100 is rotationally driven, at least the transmission mechanism or the driving force transmission mechanism can transmit the driving force from the vehicle wheel. A state where these members do not transmit the driving force is not included in the coasting state since the internal combustion engine 100 cannot be rotationally driven. In addition, the coasting state may be any state as long as the driving force from the vehicle wheel is transmitted, and may also be a so-called half clutch state.

A first embodiment of the invention will be described.

In the first embodiment of the invention, the opening degree of the intake throttle valve is increased in the case of the above-described coasting state. With such a configuration, when the internal combustion engine 100 is rotationally driven by the power transmitted from the vehicle wheel, the flow rate of the exhaust gas is ensured through the intake cycle, the compression cycle, the expansion cycle (not performing the fuel injection and the ignition), and the exhaust cycle of the internal combustion engine 100. That is, it is possible to obtain electric power by regenerating the inertial force of the vehicle when the exhaust flow rate is increased by driving the internal combustion engine 100 using the inertial force of the vehicle.

In contrast, a first comparative example is a control method of the related art and the opening degree of the intake throttle valve is decreased in accordance with the request driving force. For this reason, since the intake throttle valve is closed even when the internal combustion engine 100 is rotationally driven, the flow rate of the exhaust gas decreases and the output voltage of the generator decreases. For this reason, it is not possible to regenerate the movement energy of the vehicle in the coasting state without sufficiently driving the generator 103.

That is, as described in claim 1, an exhaust amount control unit which increases the amount of the exhaust gas supplied to the generator in the coasting state is provided to continue the power generation of the generator driven by the exhaust gas. Accordingly, since it is possible to drive the generator provided in the course of the exhaust gas also in the coasting state, the power generation opportunity can be increased.

Figure 4:
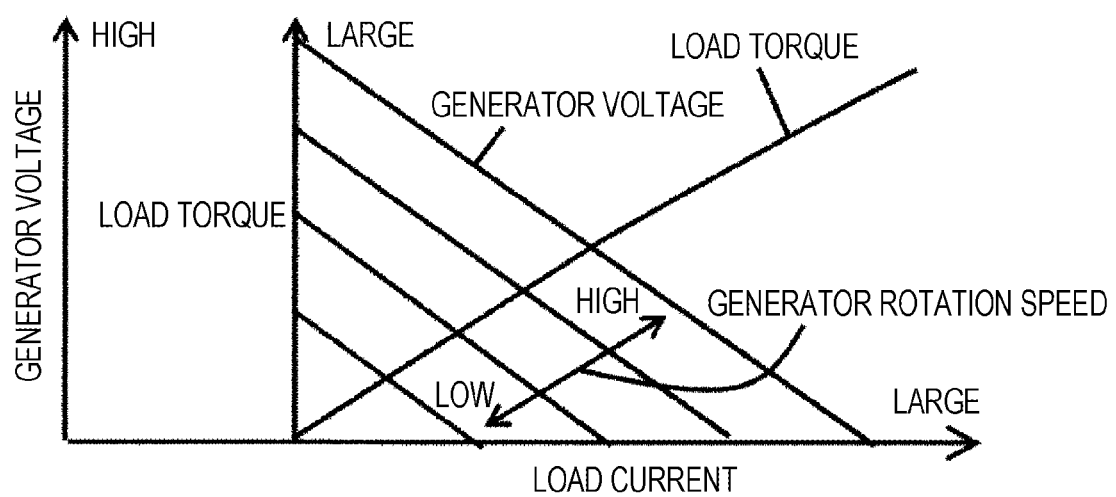
FIG. 4 is a diagram illustrating a load torque characteristic of the generator of the invention.

A second embodiment of the invention will be described. FIG. 4 is a schematic diagram illustrating a load torque characteristic with respect to a load current of the generator 103. Such a generator 103 illustrates a change in load torque in accordance with the magnitude of the load current. As the load torque increases, the load of the turbine 102 driving the generator 103 increases. This load serves as a braking force for stopping the rotation of the turbine 102.

Figure 5:
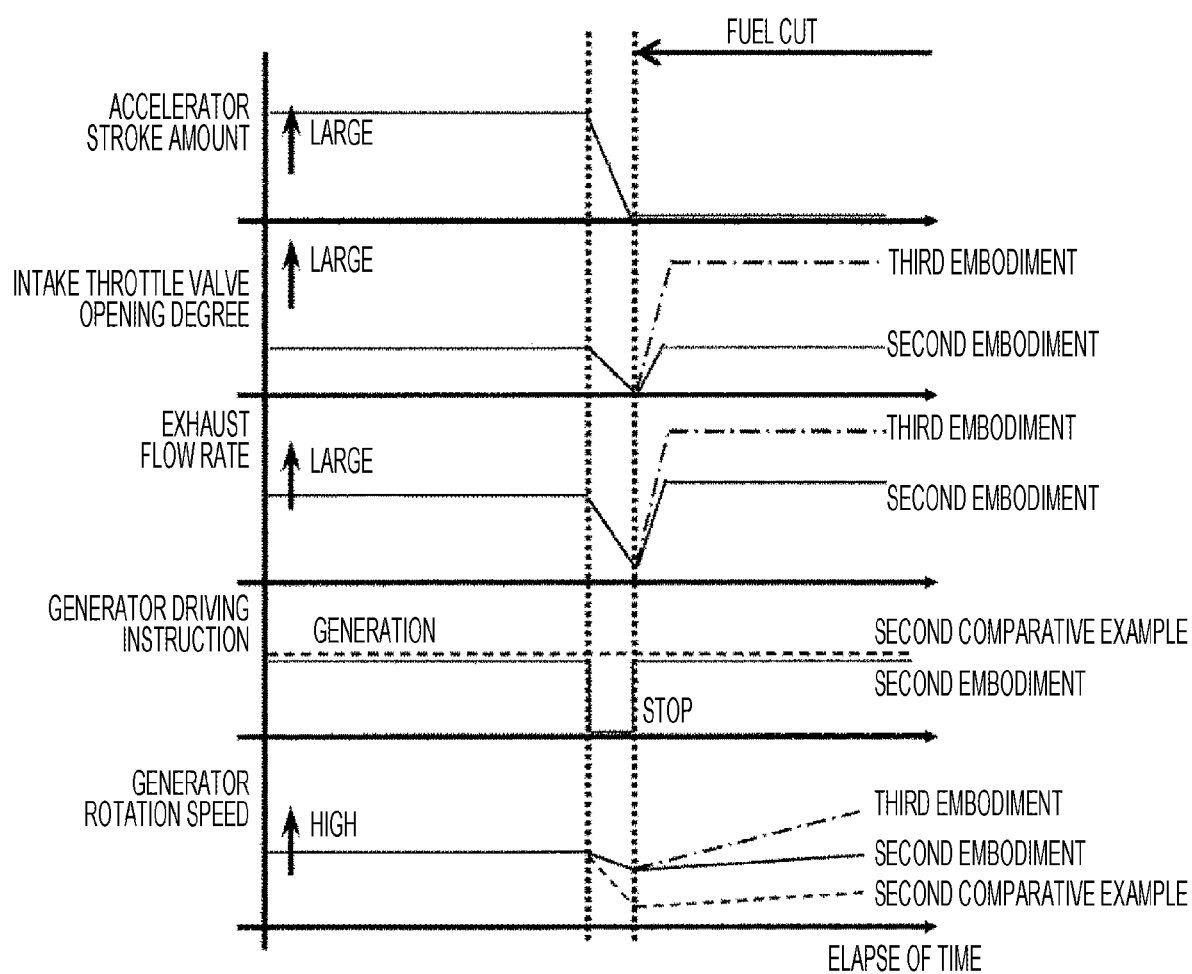
FIG. 5 is a time chart illustrating an operation difference among second and third embodiments and a second comparative example in the embodiment of the invention.

FIG. 5 is a time chart illustrating a state where the vehicle equipped with the internal combustion engine 100 illustrated in FIG. 1 enters the coasting state. In a state where the driving force request from the driver decreases and the opening degree of the intake throttle valve decreases, the second embodiment stops the generator driving instruction to the generator 103 and starts to generate electric power by the generator 103, that is, supplies a generation start signal thereto after the vehicle is in the coasting state.

As illustrated in FIG. 4, in a state where the load current is obtained by driving the generator, a braking force is exhibited to stop the rotation of the turbine 102 by the load torque of the generator 103. For this reason, in a second comparative example, it is understood that the braking force is exhibited while the opening degree of the intake throttle valve decreases so that the generator rotation speed decreases. As illustrated in FIG. 3, since the generation voltage decreases when the generator rotation speed is small, the electric power to be regenerated decreases. Thus, it is desirable to supply an appropriate generation start instruction to the generator 103 in order to increase the regenerative electric power at such a power generation opportunity.

That is, as described in claim 2, there is provided an internal combustion engine control device provided with a generator driven by an exhaust gas of an internal combustion engine, in which a generation start signal to start power generation is supplied to the generator in a coasting state. With such a configuration, since it is possible to start to generate electric power at the timing when the vehicle equipped with the internal combustion engine enters the coasting state, it is possible to increase the power generation output while suppressing an excessive decrease in generator rotation speed.

A third embodiment of the invention will be described.

As described above, the coasting state indicates a state where the fuel injection may be stopped without increasing or keeping the vehicle speed by at least the driving force of the internal combustion engine 100. Further, the coasting state indicates a state where at least the vehicle travels and the internal combustion engine 100 is rotationally driven through an axle or a transmission mechanism from the vehicle wheel.

For example, a catalyst device 121 which purifies the exhaust gas of the internal combustion engine 100 is provided at the downstream side of the turbine 102 of the vehicle in FIG. 1. The catalyst device 121 purifies carbon monoxide (CO), unburned hydrocarbons (HC), or nitrogen oxides (NOx) generated when the fuel is incompletely burned inside the combustion chamber 105. Inside the catalyst device 121, CO, HC, or NOx is purified into $CO_2$, $H_2O$, or $N_2$ by an oxidization reaction illustrated in Equations 1 and 2 or a reduction reaction illustrated in Equations 3 and 4.

$$2CO+O_2 \rightarrow 2CO_2 \quad \text{(Equation 1)}$$

$$HC+O_2 \rightarrow CO_2+H_2O \quad \text{(Equation 2)}$$

$$2NO+2CO \rightarrow 2CO_2+H_2 \quad \text{(Equation 3)}$$

$$NO+HC \rightarrow CO_2+H_2O+N_2 \quad \text{(Equation 4)}$$

Since the purification of the catalyst device 121 progresses according to the above-described chemical reaction, a reaction heat is generated during the process. When the fuel or the unburned gas is excessively supplied, there is a concern that the catalyst device 121 is excessively heated so that the catalyst device is broken.

That is, as described in claim 3, such a coasting state of the invention indicates a state where fuel supply to the internal combustion engine is stopped, that is, a travel state where the internal combustion engine is driven by, for example, the power transmitted from the vehicle wheel of the vehicle. With such a configuration, there is no need to worry about the heating of catalyst or deterioration in exhaust performance due to the unburned fuel flowing in the exhaust path and it is possible to increase the exhaust amount in order to increase the power generation opportunity.

Further, as described in claim 4, the coasting state indicates a travel state where the internal combustion engine is rotated by power of a vehicle wheel. Since the exhaust amount is increased by driving the internal combustion engine using the inertial force of the vehicle, there is no need to supply fuel for driving the internal combustion engine and it is possible to generate electric power without causing fuel consumption. That is, it is possible to regenerate the movement energy of the vehicle.

A fourth embodiment of the invention will be described.

Again, in FIG. 5, in the third embodiment, the opening degree of the intake throttle valve is increased to be further opened in accordance with the stop of the fuel injection compared to the second embodiment. With such a configuration, the exhaust flow rate is further increased at the time of stopping the fuel injection.

With such a configuration, compared to the second embodiment, the rotation recovery amount increases or the exhaust flow rate increases with respect to a decrease in rotation speed of the turbine 102 illustrated in the second embodiment or the second comparative example, thereby further increasing the output of the generator 103.

That is, as described in claim 5, the exhaust amount control unit increases an exhaust amount in the coasting state compared to the amount of the exhaust gas supplied to the generator at the timing when fuel injection to the internal combustion engine is stopped. The exhaust amount in the coasting state is increased compared to the amount of the exhaust gas supplied to the generator at the timing when the fuel injection is stopped. Accordingly, since it is possible to improve the power generation output by increasing the amount of the exhaust gas supplied to the generator, it is possible to increase the regenerative electric power amount in the case of the power generation opportunity.

Figure 6:
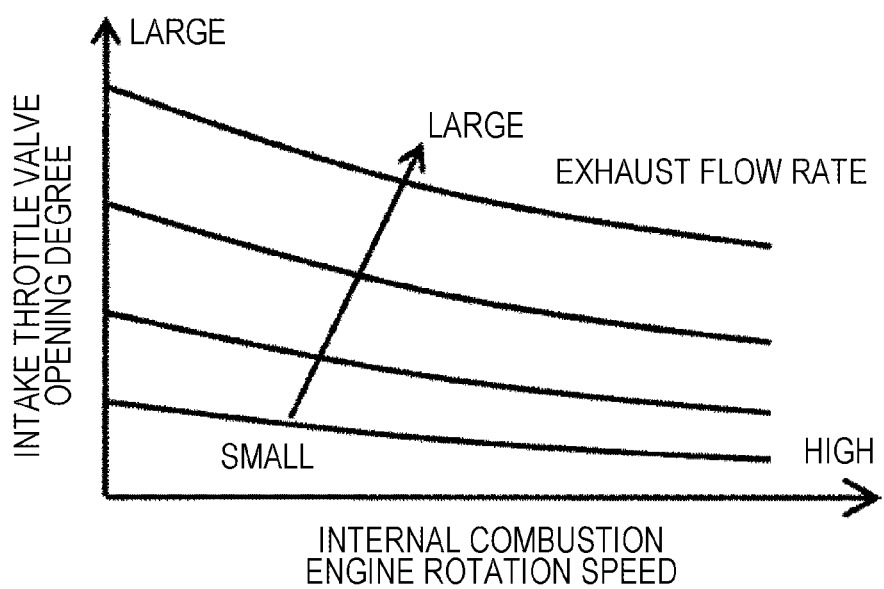
FIG. 6 is a diagram illustrating a change in exhaust flow rate by the combination of an internal combustion engine rotation speed and an intake throttle valve opening degree of the invention.

In the embodiments described so far, some cases of increasing the opening degree of the intake throttle valve to increase the exhaust flow rate have been described. Further, FIG. 6 illustrates a relation of the exhaust flow rate with respect to the rotation speed of the internal combustion engine 100 and the opening degree of the intake throttle valve. Since the exhaust flow rate has a strong correlation with the rotation speed of the internal combustion engine 100 and the opening degree of the intake throttle valve, the exhaust flow rate increases as the rotation speed of the internal combustion engine 100 increases and (or) the opening degree of the intake throttle valve increases. Similarly to the embodiments described so far, when the intake throttle valve is opened, the exhaust flow rate increases and the generator rotation speed increases. Accordingly, the regenerative electric power amount can be increased.

That is, as described in claim 6, a throttle valve adjusting the amount of air flowing into the internal combustion engine is provided at an intake side of the internal combustion engine, and the exhaust amount control unit increases the amount of the exhaust gas supplied to the generator in the coasting state by increasing an opening degree of the throttle valve.

In order to increase the exhaust gas of the internal combustion engine, the throttle valve is controlled in the opening direction. With such a configuration, since the flow path area of the throttle valve increases, the amount of the air sucked into the internal combustion engine increases and the amount of the exhaust gas supplied to the generator increases to generate electric power. Accordingly, it is possible to increase the power generation amount at the power generation opportunity by increasing the output of the generator.

A fifth embodiment of the invention will be described. The fifth embodiment has a configuration in which the amount of the air filled into the combustion chamber 105 is controlled by the phase or the lifting amount of the intake valve illustrated in FIG. 7. As illustrated in (a) of FIG. 7, when the lifting amount is increased, a gap between the intake valve and the outer wall increases. Accordingly, the air passage amount can be increased, that is, the exhaust flow rate can be increased.

Figure 7:
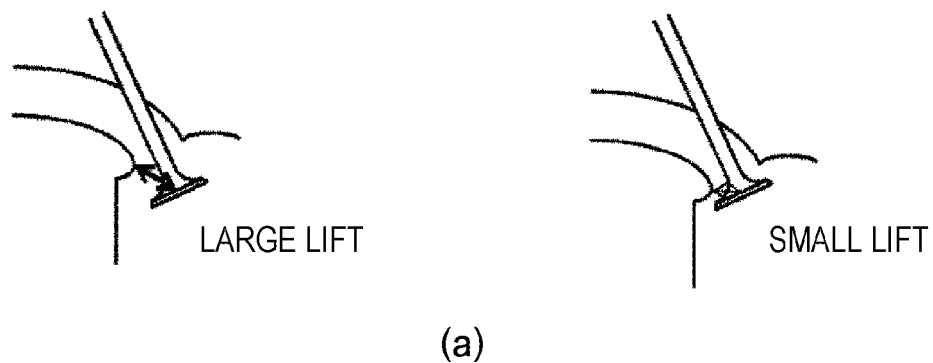
FIG. 7 is a diagram illustrating a comparison between an intake valve lifting amount and an intake valve closing timing of the embodiment of the invention.
Figure 7:
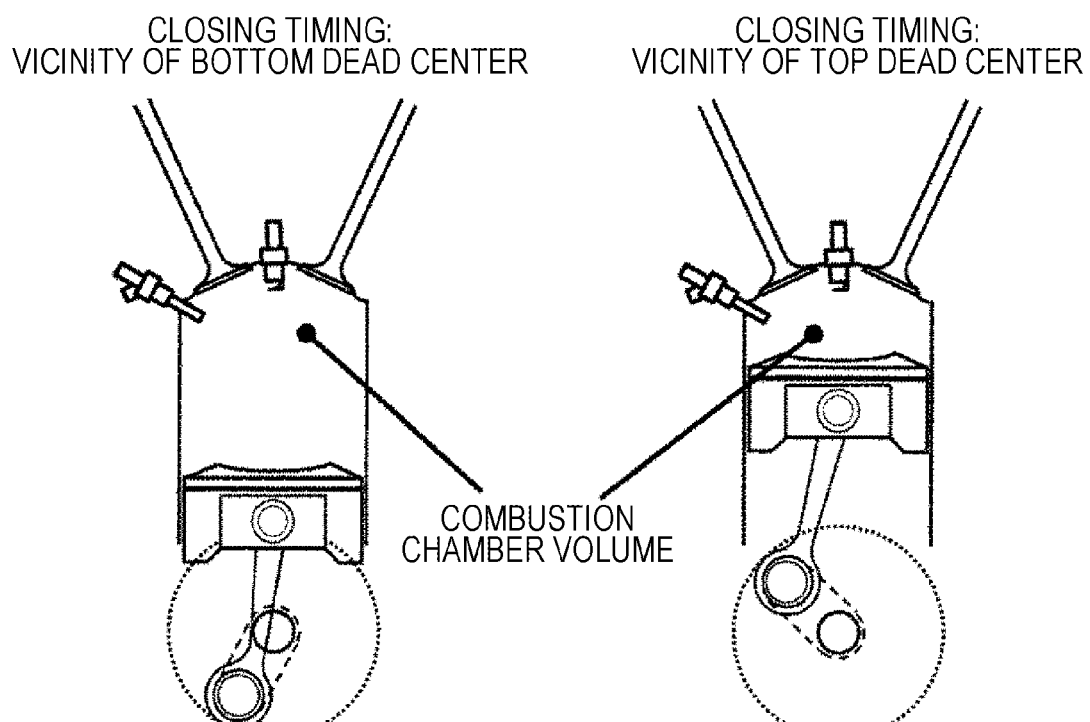

Meanwhile, as illustrated in (b) of FIG. 7, when the intake valve closing timing changes, the amount of the air introduced into the combustion chamber 105 changes depending on the intake valve closing timing. When the intake valve closing timing is set to the bottom dead center or the top dead center of the piston 106, the combustion chamber volume changes at the valve closing timing. When the intake valve closing timing is set to the vicinity of the bottom dead center having a large combustion chamber volume, the amount of the air introduced into the combustion chamber 105 increases. Accordingly, an increase in flow rate of the exhaust gas can be expected.

That is, as described in claim 7, an intake valve opening and closing an intake port of air sucked into the internal combustion engine is provided at an intake side of the internal combustion engine, and the exhaust amount control unit changes an intake valve lifting amount to be increased or an intake valve closing timing so that charging efficiency of the internal combustion engine increases.

Even in such a configuration, as illustrated in the above-described configuration of increasing the throttle opening degree, the amount of the air sucked into the internal combustion engine increases and thus the amount of the exhaust gas supplied to generate electric power increases. Accordingly, it is possible to increase the power generation amount at the power generation opportunity by increasing the output of the generator.

Further, as described in claim 7, a phase of the intake valve is changed to increase the charging efficiency of the internal combustion engine. That is, the charging efficiency is a gas exchange amount for one cycle of the internal combustion engine. When the gas exchange amount of one cycle increases, the amount of the exhaust gas supplied to the generator increases. Accordingly, the output of the generator can be increased and the power generation amount at the power generation opportunity can be increased.

A sixth embodiment of the invention will be described.

Figure 8:
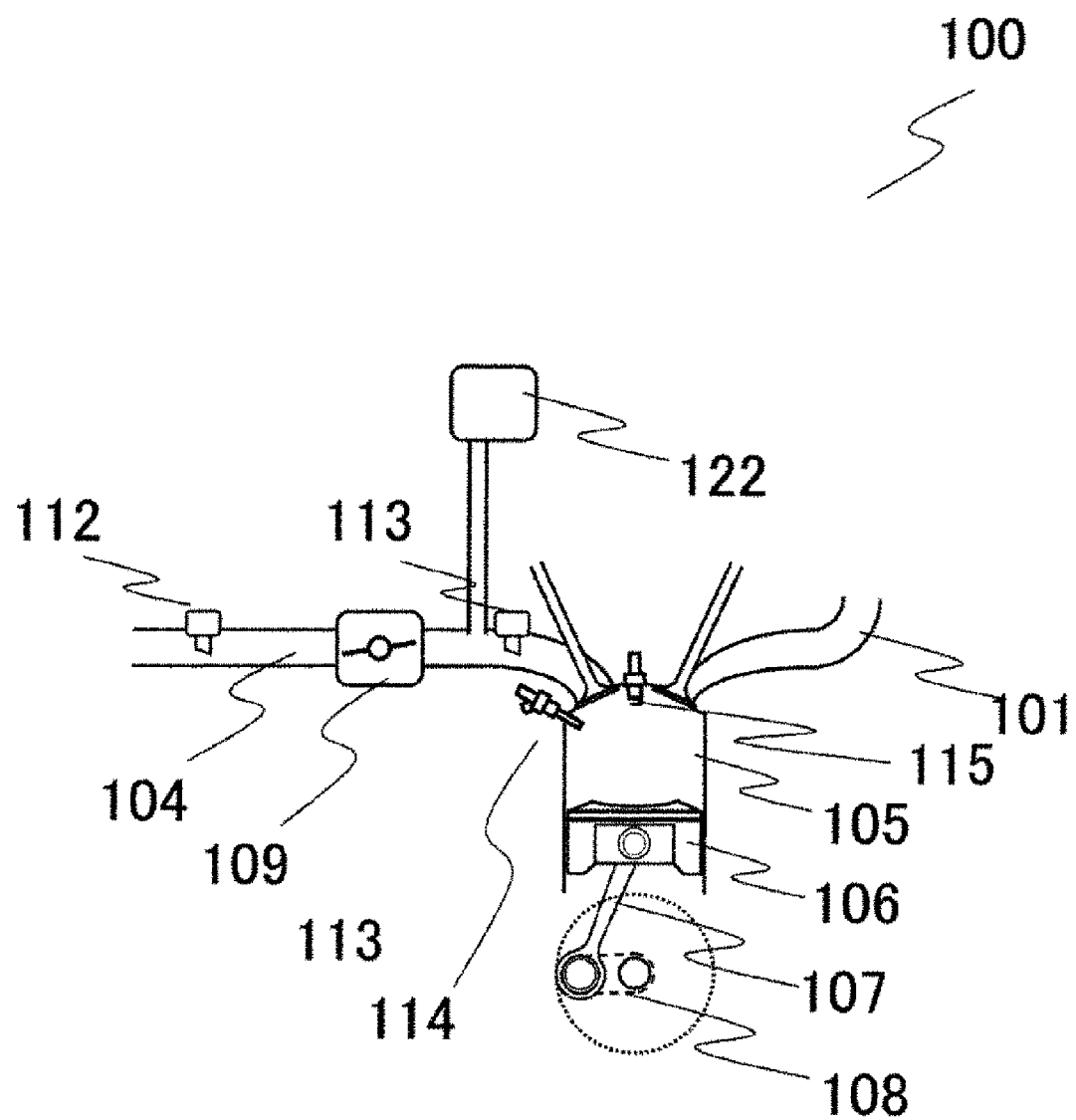
FIG. 8 is a diagram illustrating a configuration of an internal combustion engine provided with a brake boosting device of a sixth embodiment of the invention.

In FIG. 8, the intake path 104 is provided with a brake boosting device 122 which uses a negative pressure generated in the intake throttle valve 109 to the combustion chamber 105.

In the sixth embodiment, a configuration in which a negative pressure necessary for the brake boosting device 122 is ensured also in the coasting state will be described.

Since the internal combustion engine 100 is basically operated under an atmospheric pressure, when the intake air amount is limited by the intake throttle valve 109, a negative pressure is formed in the intake throttle valve 109 to the combustion chamber 105 with respect to the atmospheric pressure. Since the brake boosting device 122 uses a pressure difference between the negative pressure and the atmospheric pressure, a negative pressure (an intake pipe pressure and a manifold pressure) in the intake throttle valve 109 to the combustion chamber 105 detected by the intake pipe pressure sensor 113 needs to be a predetermined value or less in order to attain a desired operation in the vehicle including the brake boosting device 122.

Figure 9:
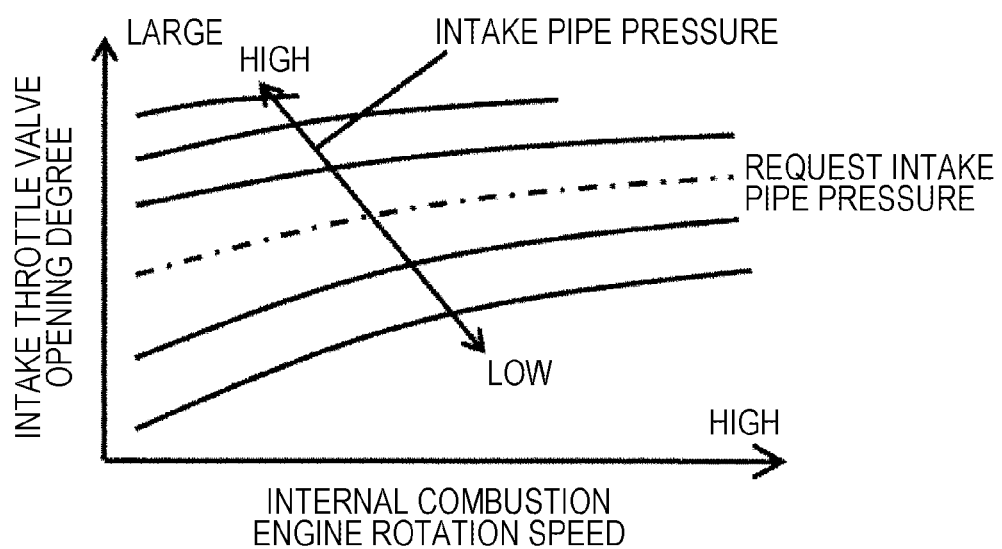
FIG. 9 is a diagram illustrating a change in intake pipe pressure by the combination of an internal combustion engine rotation speed and an intake throttle valve opening degree of the invention.

FIG. 9 illustrates a relation of the manifold pressure with respect to the rotation speed of the internal combustion engine 100 and the opening degree of the intake throttle valve.

That is, when the manifold pressure is set to a predetermined value, it is possible to increase the regeneration opportunity and the exhaust flow rate without the interference with the operation of the brake boosting device 122 by controlling the intake throttle valve 109. That is, as defined in claim 8, the exhaust amount control unit increases the amount of the exhaust gas supplied to the generator when a pressure at the intake side of the internal combustion engine is equal to or larger than the setting value in the coasting state. Further, as defined in claim 9, the exhaust amount control unit can increase the regeneration opportunity and the exhaust flow rate without the interference with the operation of the brake boosting device 122 by keeping or decreasing the amount of the exhaust gas supplied to the generator when a pressure at the intake side of the internal combustion engine is smaller than the setting value even in the coasting state.

In FIG. 1, a seventh embodiment of the invention includes an external field recognition unit 123 configured as, for example, an image pickup device such as a camera.

It is possible to determine whether the vehicle needs to be immediately braked by detecting information around the vehicle using the external field recognition unit 123. For example, such a determination is made based on a distance between a vehicle and another vehicle traveling in front of the vehicle, a gradient of a road on which a vehicle travels, and a condition of a road on which a vehicle travels.

Figure 10:
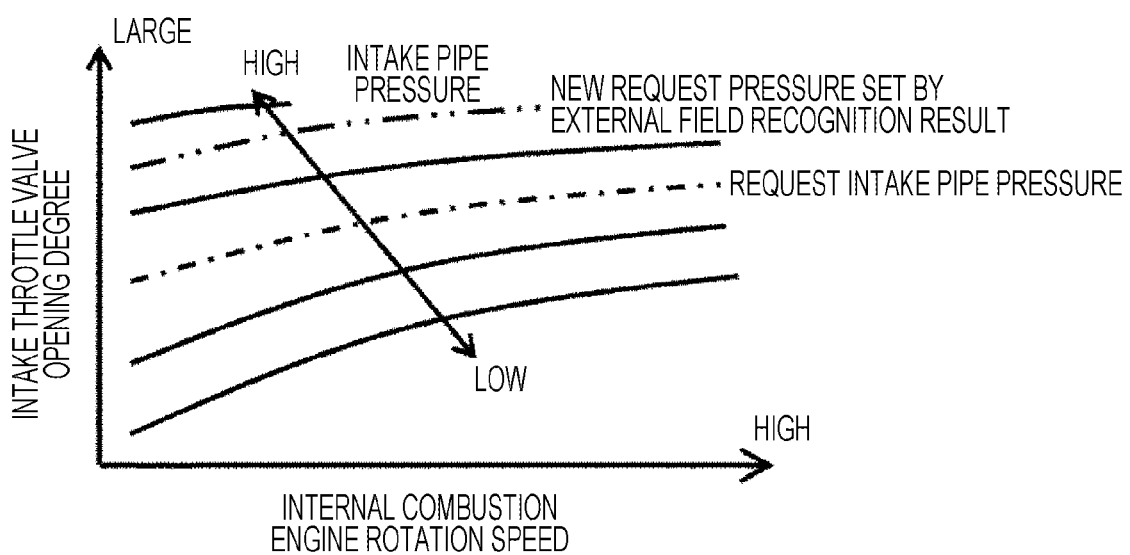
FIG. 10 is a diagram illustrating a change in threshold value of an intake pipe pressure of a seventh embodiment of the invention.

At this time, when it is determined that the braking operation is not immediately necessary, a predetermined value of the manifold pressure is set again to a high pressure side as illustrated in FIG. 10. That is, as defined in claim 10, the setting value is corrected based on a detection result of the external field recognition unit of the vehicle. With such a configuration, for example, the intake throttle valve can be controlled in a further opening direction. Accordingly, since the exhaust flow rate can be increased, the generation amount of the generator 103 can be increased and thus the power generation opportunity of the generator 103 in the coasting state can be increased.

The above-described external field recognition unit can be configured as a radar using electromagnetic waves such as infrared rays, ultrasonic waves, and millimeter waves in addition to an image pickup device such as a camera. For example, when it is possible to determine that the braking operation is not immediately necessary for the driver, using a vehicle-to-vehicle distance with respect to the front traveling vehicle, any method of the related art may be used. Thus, when a threshold value is corrected to increase the negative pressure of the intake pipe as a determination result so that the exhaust flow rate increases, it is possible to obtain an effect of increasing the power generation opportunity by the generator 103.

An eighth embodiment of the invention will be described.

Figure 11:
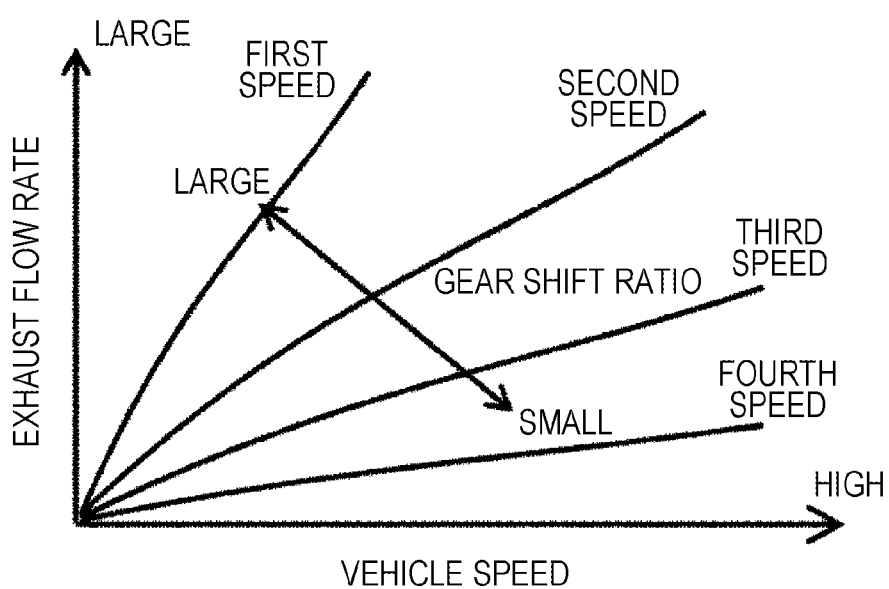
FIG. 11 is a diagram in which a relation between a vehicle speed and an exhaust flow rate of an eighth embodiment of the invention is summarized as a gear shift ratio.

In the eighth embodiment of the invention, the vehicle includes a transmission as described in claim 11 and a gear shift ratio is changed so that the rotation speed of the internal combustion engine in the coasting state increases. FIG. 11 schematically illustrates a change in exhaust flow rate with respect to a vehicle speed according to each gear shift ratio of a multi-stage transmission while the opening degree of the intake throttle valve is fixed. As illustrated in FIG. 11, the exhaust flow rate increases at the same vehicle speed as the gear shift ratio increase, that is, the exhaust flow rate increases in the coasting state. Accordingly, the power generation output of the generator 103 can be increased.

Figure 12:
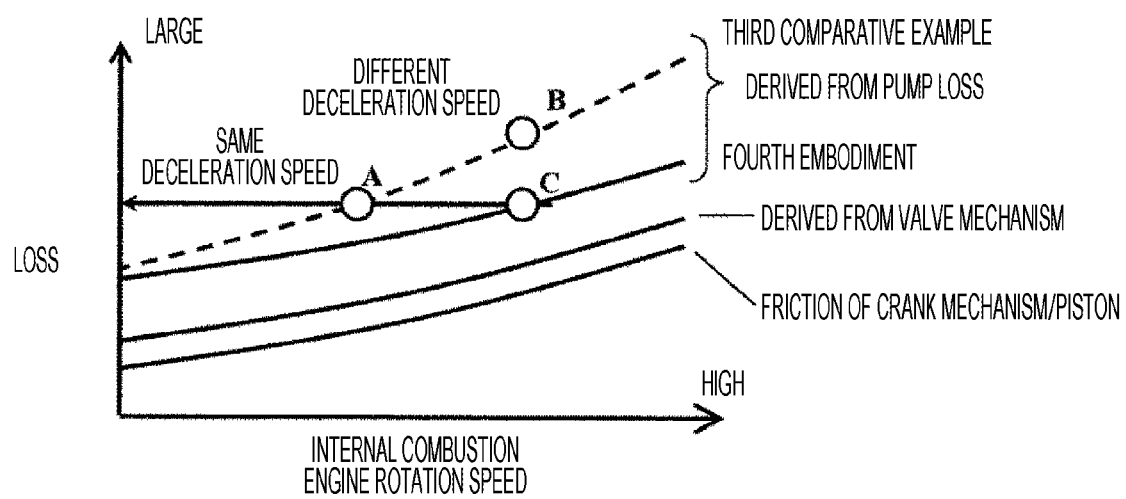
FIG. 12 is a diagram illustrating a relation between an internal combustion engine rotation speed and loss of the eighth embodiment of the invention.

Incidentally, in the above-described eighth embodiment, it is intended that the gear shift ratio is changed to increase the rotation speed of the internal combustion engine. Thus, the operation point of the internal combustion engine moves from the point A toward the point B in FIG. 12. FIG. 12 illustrates a relation between the rotation speed of the internal combustion engine and the loss (in this case, a resistance disturbing the rotation of the internal combustion engine). When only the gear shift ratio of the transmission unit is changed while the opening degree of the intake throttle valve is not changed, loss occurs as in the third comparative example.

In contrast, the opening degree of the intake throttle valve is different in the fourth embodiment and the opening degree of the intake throttle valve in the fourth embodiment is set to be larger than that of the third comparative example. At this time, in the third comparative example in FIG. 12, loss increases in accordance with an increase in rotation speed of the internal combustion engine 100 due to a high gear shift ratio in the coasting state. As a result, the driver feels increased deceleration. Further, since a so-called engine brake is strongly operated, the vehicle speed further decreases and the coasting distance decreases. As a result, the regeneration opportunity of the generator 103 decreases due to a decrease in coasting opportunity.

Further, since the opportunity of increasing the vehicle speed by the driver increases, the fuel injection is necessary to keep the vehicle speed and thus the fuel efficiency is deteriorated. Meanwhile, in the fourth embodiment, since the opening degree of the intake throttle valve is controlled in the opening direction, the pump loss decreases. Thus, the rotation speed of the internal combustion engine can be increased while having the same loss as the point A.

Figure 13:
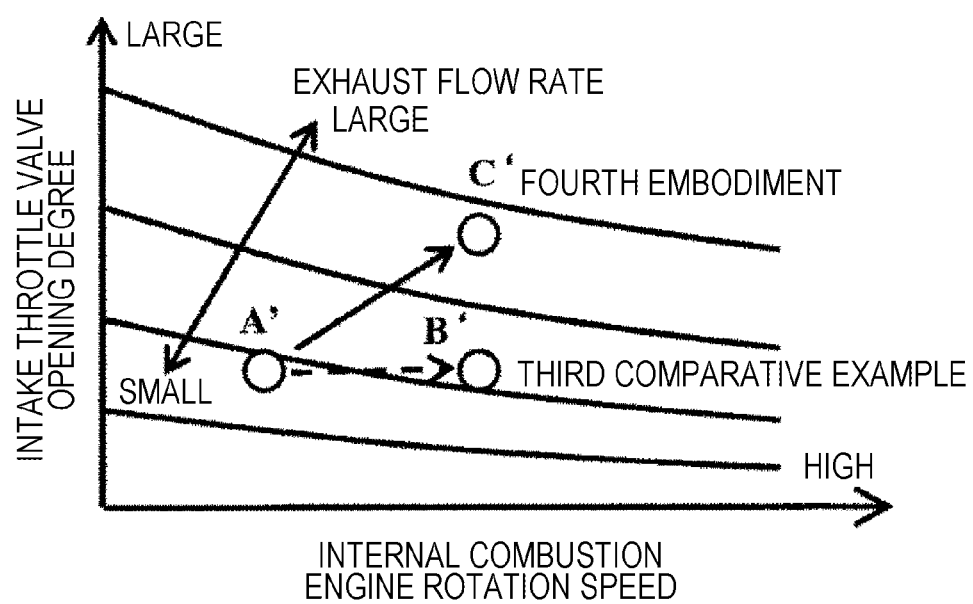
FIG. 13 is a diagram illustrating a case where a change in gear shift ratio and a change in intake throttle valve opening degree are simultaneously performed in the eighth embodiment of the invention.

The description above is summarized in FIG. 13 from the viewpoint of the exhaust flow rate.

By a change in gear shift ratio, the rotation speed of the internal combustion engine increases and the exhaust flow rate increases at the same intake throttle valve opening degree. At this time (during the movement from the point A' to the point B'), in the fourth embodiment, since the intake throttle valve is controlled in the opening direction in addition to an increase in rotation speed described above, the exhaust flow rate further increases (during the movement from the point A' to the point C'). Thus, as defined in claim 12, the exhaust amount of the internal combustion engine changed by the exhaust amount control unit is increased or decreased based on any of at least the gear shift ratio of the transmission unit, the rotation speed of the internal combustion engine, and the vehicle speed. Accordingly, it is possible to increase the power generation opportunity of the generator 103 by increasing the exhaust flow rate without a sudden change in deceleration of the vehicle.

In the above-described fourth embodiment, for example, since the deceleration obtained by the differential value based on the vehicle speed is used, it is possible to obtain a sense of deceleration in accordance with the request of the driver by changing the opening degree of the intake throttle valve or the gear shift ratio of the transmission unit with respect to the request deceleration required when the driver releases the brake pedal or the accelerator pedal. Accordingly, it is possible to reduce a mental burden of a passenger.

Further, in the embodiment, a technology using a stepped transmission has been described, but the transmission unit is not limited to the stepped transmission. A continuously variable transmission (CVT) in which a gear shift ratio is continuously changed by a tapered roller and a winding transmission mechanism can be used.

Basically, the gear shift ratio and the opening degree of the intake throttle valve may be selected so that the rotation speed of the internal combustion engine increases within a range in which a deceleration does not increase.

Further, even in this case, as described in the other embodiments, the above-described gear shift ratio and the opening degree of the intake throttle valve may be changed within a range in which the manifold pressure becomes a predetermined value or less based on the detection result of the intake pipe pressure sensor. That is, a plurality of embodiments described so far is not independent, and the embodiments may be combined with each other.

The drawings used to describe the embodiments of the invention are intended to describe an Otto-cycle gasoline engine of an automobile, but the type of internal combustion engine is not limited thereto. The internal combustion engine may be a diesel engine and the number of cylinders is not limited. Further, the invention is not limited to a reciprocating engine that converts the reciprocating movement of the piston into power by the crank mechanism and may be a Wankel engine.

In addition, in the embodiments of the invention and the drawings used in the description thereof, only the functions and configurations necessary for describing the invention are described. In the actual application of the invention, a control or a function not described in a certain embodiment of the invention can be achieved by using the related art.

It should be understood that the invention does not necessarily include all configurations described above and is not limited to the configurations of the embodiments described above. A part of the embodiments can be substituted by other embodiments and addition, deletion, or substitution of the other embodiments can be made on a part of the configuration of each embodiment unless the characteristic is remarkably changed.

REFERENCE SIGNS LIST 100 internal combustion engine
101 exhaust path
102 turbine
103 generator
104 intake path
105 combustion chamber
106 piston
107 connecting rod
108 crank
109 intake throttle valve
110 intake valve
111 exhaust valve
112 air flow meter
113 intake pipe pressure sensor
114 fuel injection valve
115 ignition plug
116 accelerator pedal
117 brake pedal
118 control device
119 accelerator stroke sensor
120 brake stroke sensor
121 catalyst device
122 brake boosting device
123 external field recognition unit

The invention claimed is:

1. An internal combustion engine control device provided with a generator driven by an exhaust gas of an internal combustion engine, comprising:
an exhaust amount control unit configured to increase an amount of the exhaust gas supplied to the generator in a coasting state,
wherein a generation start signal to start power generation is supplied to the generator in the coasting state.

2. The internal combustion engine control device according to claim 1,
wherein the coasting state indicates a state where fuel injection to the internal combustion engine is stopped.

3. The internal combustion engine control device according to claim 1,
wherein the coasting state indicates a travel state where the internal combustion engine is rotated by power of a vehicle wheel.

4. The internal combustion engine control device according to claim 1,
wherein the exhaust amount control unit is configured to increase the amount of the exhaust gas in the coasting state compared to the amount of the exhaust gas supplied to the generator at a timing when fuel injection to the internal combustion engine is stopped.

5. The internal combustion engine control device according to claim 1,
wherein a throttle valve adjusting the amount of air flowing into the internal combustion engine is provided at an intake side of the internal combustion engine, and
wherein the exhaust amount control unit is configured to increase the amount of the exhaust gas supplied to the generator in the coasting state in which an opening degree of the throttle valve is increased.

6. The internal combustion engine control device according to claim 1,
wherein an intake valve opening and closing an intake port to suck air into the internal combustion engine is provided at an intake side of the internal combustion engine, and
wherein the exhaust amount control unit is configured to change an intake valve lifting amount to be increased or an intake valve closing timing so that charging efficiency of the internal combustion engine increases.

7. The internal combustion engine control device according to claim 1,
wherein the exhaust amount control unit is configured to increase the amount of the exhaust gas supplied to the generator when a pressure at an intake side of the internal combustion engine is equal to or larger than a setting value in the coasting state.

8. The internal combustion engine control device according to claim 1,
wherein the exhaust amount control unit is configured to keep or decrease the amount of the exhaust gas supplied to the generator when a pressure at an intake side of the internal combustion engine is smaller than a setting value even in the coasting state.

9. The internal combustion engine control device according to claim 8,
wherein the setting value is corrected based on a detection result of an external field recognition unit of a vehicle.

10. The internal combustion engine control device according to claim 1,
wherein a gear shift ratio of a transmission unit of a vehicle is changed so that a rotation speed of the internal combustion engine increases in the coasting state.

11. The internal combustion engine control device according to claim 10,
wherein the amount of the exhaust gas of the internal combustion engine changed by the exhaust amount control unit is increased or decreased based on any of at least the gear shift ratio of the transmission unit, an internal combustion engine rotation speed, and a vehicle speed.

12. An internal combustion engine control device provided with a generator driven by an exhaust gas of an internal combustion engine,
wherein a generation start signal to start power generation is supplied to the generator in a coasting state.

13. The internal combustion engine control device according to claim 12,
wherein the coasting state indicates a state where fuel injection to the internal combustion engine is stopped.

14. The internal combustion engine control device according to claim 12,
wherein the coasting state indicates a travel state where the internal combustion engine is rotated by power of a vehicle wheel.

15. The internal combustion engine control device according to claim 12,
wherein an exhaust amount control unit is configured to increase an amount of the exhaust gas in the coasting state compared to the amount of the exhaust gas supplied to the generator at a timing when fuel injection to the internal combustion engine is stopped.

16. The internal combustion engine control device according to claim 12,
wherein a throttle valve adjusting the amount of air flowing into the internal combustion engine is provided at an intake side of the internal combustion engine, and
wherein an exhaust amount control unit is configured to increase the amount of the exhaust gas supplied to the generator in the coasting state in which an opening degree of the throttle valve is increased.

17. The internal combustion engine control device according to claim 12,
wherein an intake valve opening and closing an intake port to suck air into the internal combustion engine is provided at an intake side of the internal combustion engine, and
wherein an exhaust amount control unit is configured to change an intake valve lifting amount to be increased or an intake valve closing timing so that charging efficiency of the internal combustion engine increases.

18. The internal combustion engine control device according to claim 12,
wherein an exhaust amount control unit is configured to increase the amount of the exhaust gas supplied to the generator when a pressure at an intake side of the internal combustion engine is equal to or larger than a setting value in the coasting state.

19. The internal combustion engine control device according to claim 12,
wherein an exhaust amount control unit is configured to keep or decrease the amount of the exhaust gas supplied to the generator when a pressure at an intake side of the internal combustion engine is smaller than a setting value even in the coasting state.

20. The internal combustion engine control device according to claim 19,
wherein the setting value is corrected based on a detection result of an external field recognition unit of a vehicle.

21. The internal combustion engine control device according to claim 12,
wherein a gear shift ratio of a transmission unit of a vehicle is changed so that a rotation speed of the internal combustion engine increases in the coasting state.

22. The internal combustion engine control device according to claim 21,
wherein the amount of the exhaust gas of the internal combustion engine changed by an exhaust amount control unit is increased or decreased based on any of at least the gear shift ratio of the transmission unit, an internal combustion engine rotation speed, and a vehicle speed.

* * * * *